United States Patent [19]
Shimada et al.

[11] Patent Number: 5,271,370
[45] Date of Patent: Dec. 21, 1993

[54] EMULSION FUEL ENGINE

[75] Inventors: Taizo Shimada, Yokohama; Kiyoharu Yamada, Sagamihara; Yutaka Zaha, Yokohama, all of Japan

[73] Assignees: Mitsubishi Jidosha Kogyo Kabushiki Kaisha; Mitsubishi Jidosha Engineering Kabushiki Kaisha, both of Tokyo, Japan

[21] Appl. No.: 918,378

[22] Filed: Jul. 24, 1992

[30] Foreign Application Priority Data

Jul. 31, 1991 [JP] Japan .................... 3-60326

[51] Int. Cl.⁵ .................................. F02M 25/06
[52] U.S. Cl. .................................. 123/568; 123/575; 123/25 A
[58] Field of Search ............ 123/569, 568, 575, 25 A, 123/25 C, 25 E

[56] References Cited

U.S. PATENT DOCUMENTS

| | | | |
|---|---|---|---|
| 3,921,599 | 11/1975 | Grow | 123/25 E |
| 4,350,013 | 9/1982 | Yoshiba | 123/569 |
| 4,369,753 | 1/1983 | Sugiyama | 123/569 |
| 4,387,694 | 6/1983 | Yoshiba et al. | 123/569 |
| 4,412,512 | 11/1983 | Cottell | 123/25 C |
| 4,462,377 | 7/1984 | Tanaka et al. | 123/569 |
| 4,503,813 | 3/1985 | Lindberg | 123/25 B |

*Primary Examiner*—Tony M. Argenbright
*Assistant Examiner*—M. Macy
*Attorney, Agent, or Firm*—Wegner, Cantor, Mueller & Player

[57] ABSTRACT

Diesel fuel is stored in a first fuel tank, while water is stored in a second fuel tank. To use an emulsion fuel, diesel fuel and water are mixed and are caused to enter an injection pipe through a junction located between an injection pump and an injection nozzle. The emulsion fuel is injected through the injection nozzle. The engine is also equipped with exhaust gas recirculation devices to return a portion of the exhaust gas of the engine to an intake pipe of the engine so that some of the exhaust gas is recirculated.

16 Claims, 8 Drawing Sheets

FIG.5

| | COMBUSTION NOISE | NOx | SMOKE | PARTICULATE | SPECIFIC FUEL CONSUMPTION | OIL CONTAMINATION |
|---|---|---|---|---|---|---|
| EMULSION FUEL EMPLOYED | C | A | A | B | A | B |
| EGR | B | B | C | C | C | C |
| COMBINED | — | A | — | — | B | — |

A: EXCELLENT, B: GOOD, C: POOR, —: CANCELLED OUT

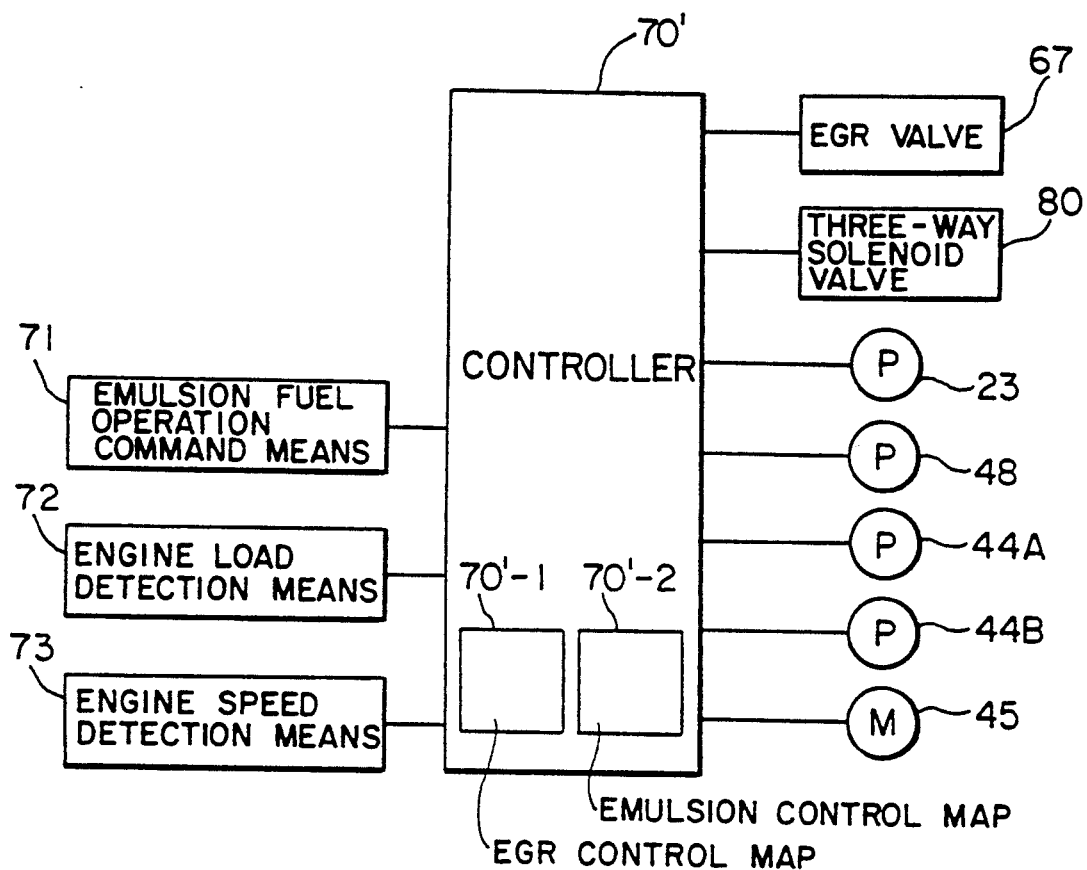
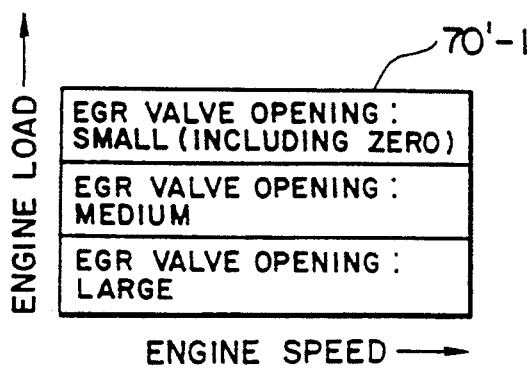
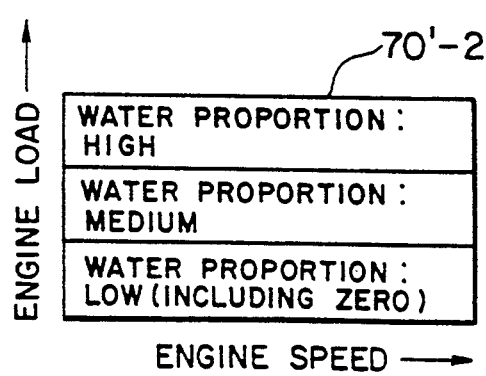

EMULSION FUEL ENGINE

BACKGROUND OF THE INVENTION

1) Field of the Invention

This invention relates to an emulsion fuel engine which uses an emulsion fuel as a fuel, and more specifically to an emulsion fuel engine with reduced combustion noise and extended service life for the injection system components.

2) Description of the Related Art

To produce less exhaust gas and reduce the specific fuel consumption, diesel engines using an emulsion fuel are known. The term "emulsion fuel" as used herein mean a fuel formed by emulsifying mutually-insoluble fuels, for example, water and diesel fuel, water and heavy oil, or methanol and diesel fuel.

Referring to FIG. 10, the construction of a conventional emulsion fuel engine will be described. In FIG. 10, numeral 1 indicates a fuel tank in which an emulsion fuel (for example, water and diesel fuel) is stored. Arranged between the fuel tank 1 and an injection pump 2 is a fuel pipe FP which is provided with a fuel pump 3 for delivering the emulsion fuel and also with a fuel filter 4.

The injection pump 2 is provided with a reciprocating plunger 7 which moves up and down as a camshaft 5 rotates together with a cam 6. The injection pump 2 begins to draw the fuel after an upper end face of the plunger 7 has come to a position lower than a fuel draw/spill port 9. After the upper end face of the plunger 7 has moved to a position above the fuel draw/spill port 9, the injection pump 2 begins to deliver the fuel under pressure. When a lead 10 formed in a peripheral wall of the plunger 7 has overlapped the fuel draw/spill port 9, the injection pump 2 terminates the delivery of the fuel under pressure. Designated at numeral 11 is a delivery valve for the prevention of a reverse flow.

An injection pipe IP is arranged between a top portion of the injection pump 2 and an injection nozzle 12. A fuel feed channel 13 is formed inside the injection nozzle 12. Through the fuel feed channel 13, the fuel which has been delivered under pressure from the injection pipe IP is guided to a lower part of the nozzle 12. A needle valve 14 is lifted by the pressure of the fuel, whereby the fuel is injected into the combustion chamber through injector holes 15.

The fuel discharged from the injection pump 2 and the injection nozzle 12 is returned to the fuel tank 1 via a fuel return pipe 16.

An emulsion fuel has poor ignitability in a cylinder so that ignition delay is prolonged. The fuel is therefore injected in quantity until it is ignited. Since this fuel then burns at once at the time of ignition, the pressure inside the cylinder increases at a high rate and, accordingly, combustion noise tends to occur.

In conventional emulsion fuel engines, an emulsion fuel prepared in advance is merely stored in the fuel tank 1 instead of diesel fuel.

A diesel engine injection system includes many parts operating in the fuel with micron-level clearances. An emulsion fuel with enclosed water droplet induces excess wear due to insufficient lubrication and rusting at the injection pump 2, resulting in the problem that the durability of the injection pump 2 is reduced.

At the injection nozzle 12, the injector holes 15 may be clogged by abraded particles formed by the excessive wear, leading to the problem that the durability of the injection nozzle 12 is reduced.

SUMMARY OF THE INVENTION

With the foregoing in view, the present invention has as a first object the provision of an emulsion fuel engine capable of avoiding deterioration of the combustion noise, said deterioration being otherwise unavoidable because of the use of an emulsion fuel and, as a second object, the provision of an emulsion fuel engine capable of avoiding the reduction in the durability of parts of an injection system.

In one aspect of this invention, there is thus provided an emulsion fuel engine having at least one cylinder with an injection nozzle for injecting an emulsion fuel, which has been formed by mixing a first fuel with a second fuel, into the cylinder. The engine comprises exhaust gas recirculation means for returning a portion of exhaust gas to an intake passage to recirculate the exhaust gas; and exhaust gas recirculation control means for controlling the amount of the exhaust gas to be recirculated by the exhaust gas recirculation means.

Preferably, said exhaust gas recirculation means comprises an EGR valve interposed in an exhaust gas recirculation passage extending between an exhaust passage and the intake passage for adjusting the amount of the exhaust gas to be recirculated through the exhaust gas recirculation passage, and the EGR valve is controlled by the exhaust gas recirculation control means so that the opening of the EGR valve is decreased when the engine load is high but the opening of the EGR valve is increased when the engine load is low. Further, an engine load range can be divided into plural engine load sub-ranges and EGR valve opening information can be set independently for each engine load sub-range.

Said exhaust gas recirculation means may control the opening of the EGR valve at a constant value irrespective of the engine load.

In another aspect of this invention, there is also provided an emulsion fuel engine having at least one cylinder. The engine comprises: a first fuel tank for storing a first fuel therein; a second fuel tank for storing a second fuel therein; an injection nozzle attached to the cylinder; an injection pump for drawing the first fuel from the first fuel tank and delivering under pressure the first fuel at a predetermined timing toward the injection nozzle; means for mixing the first fuel from the first fuel tank and the second fuel from the second fuel tank, whereby an emulsion fuel is formed; means for feeding the emulsion fuel, which has been delivered from said mixing means to an injection pipe at a location between the injection pump and the injection nozzle; exhaust gas recirculation means for returning a portion of exhaust gas to an intake passage to recirculate the exhaust gas; and exhaust gas recirculation control means for controlling the amount of the exhaust gas to be recirculated by the said exhaust gas recirculation means.

Preferably, said exhaust gas recirculation means comprises an EGR valve interposed in an exhaust gas recirculation passage extending between an exhaust passage and the intake passage for adjusting the amount of the exhaust gas to be recirculated through the exhaust gas recirculation passage, and the EGR valve is controlled by the exhaust gas recirculation control means so that the opening of the EGR valve is decreased when the engine load is high but the opening of the EGR valve is increased when the engine load is low. Further, an engine load range can be divided into plural engine load sub-ranges and EGR valve opening information can be set independently for each engine load sub-range.

Said mixing means can change the mixing ratio of the first fuel to the second fuel in accordance with the engine load. Said mixing means may comprise a three-way valve connected to both the first fuel tank and the second fuel tank so that the mixing ratio of the first fuel to the second fuel may be changed.

More specifically, said exhaust gas recirculation means can comprises an EGR valve interposed in an exhaust gas recirculation passage extending between an exhaust passage and the intake passage for adjusting the amount of the exhaust gas to be recirculated through the exhaust gas recirculation passage. When the engine load is high, the opening of the EGR valve can be decreased and the proportion of the second fuel is increased. When the engine load is low, the opening of the EGR valve can be increased and the proportion of the second fuel can be decreased. In this case, an engine load range can be divided into first plural engine load sub-ranges for EGR valve opening information and also into second plural engine load sub-ranges for first fuel/second fuel mixing ratio information, and EGR valve opening information and mixing ratio information can be set independently for each engine load sub-range. The first plural engine load sub-ranges for the EGR valve opening information and the second plural engine load sub-ranges for the first fuel/second fuel mixing ratio information may be consistent with each other.

Further, said exhaust gas recirculation means may comprise an EGR valve interposed in an exhaust gas recirculation passage extending between an exhaust passage and the intake passage for adjusting the amount of the exhaust gas to be recirculated through the exhaust gas recirculation passage, and said exhaust gas recirculation control means may control the opening of the EGR valve at a constant value irrespective of the engine load.

Desirably, a constant-pressure valve having the mechanism of a bidirectional check valve may be disposed at a discharge port of the injection pump, said discharge port being on a side of the injection pipe. An emulsion fuel tank for storing the emulsion fuel from said mixing means may be provided between said mixing means and said emulsion fuel feeding means. Said emulsion fuel feeding means may be provided with a check valve so that the emulsion fuel is allowed to penetrate into the injection pipe when the pressure of the emulsion fuel has become higher than the pressure of the fuel within the injection pipe.

When an emulsion fuel is used, for example, by storing diesel fuel in the first fuel tank and water in the second fuel tank, the diesel fuel and the water are mixed together and the emulsion fuel so formed is caused to enter the injection pipe at a location between the injection pump and the injection nozzle. The emulsion fuel is then injected through the injection nozzle to rotate the emulsion fuel engine. At this time, the exhaust gas from the engine is partly recirculated to the intake pipe, in other words, exhaust gas recirculation is performed to avoid deterioration of the combustion noise.

According to the present invention, it is therefore possible to provide an emulsion fuel engine with reduced combustion noise and extended service life for the injection system components.

BRIEF DESCRIPTION OF THE DRAWINGS

FIG. 5 is a table showing effects of the emulsion fuel engine according to the first embodiment of this invention;

FIG. 7 is a block diagram of a control system for the emulsion fuel engine according to the second embodiment of this invention;

FIG. 8($a$) is an illustration of an EGR control map while FIG. 8($b$) is an illustration of an emulsion control map;

DETAILED DESCRIPTION OF THE INVENTION AND PREFERRED EMBODIMENTS

Figure 1:
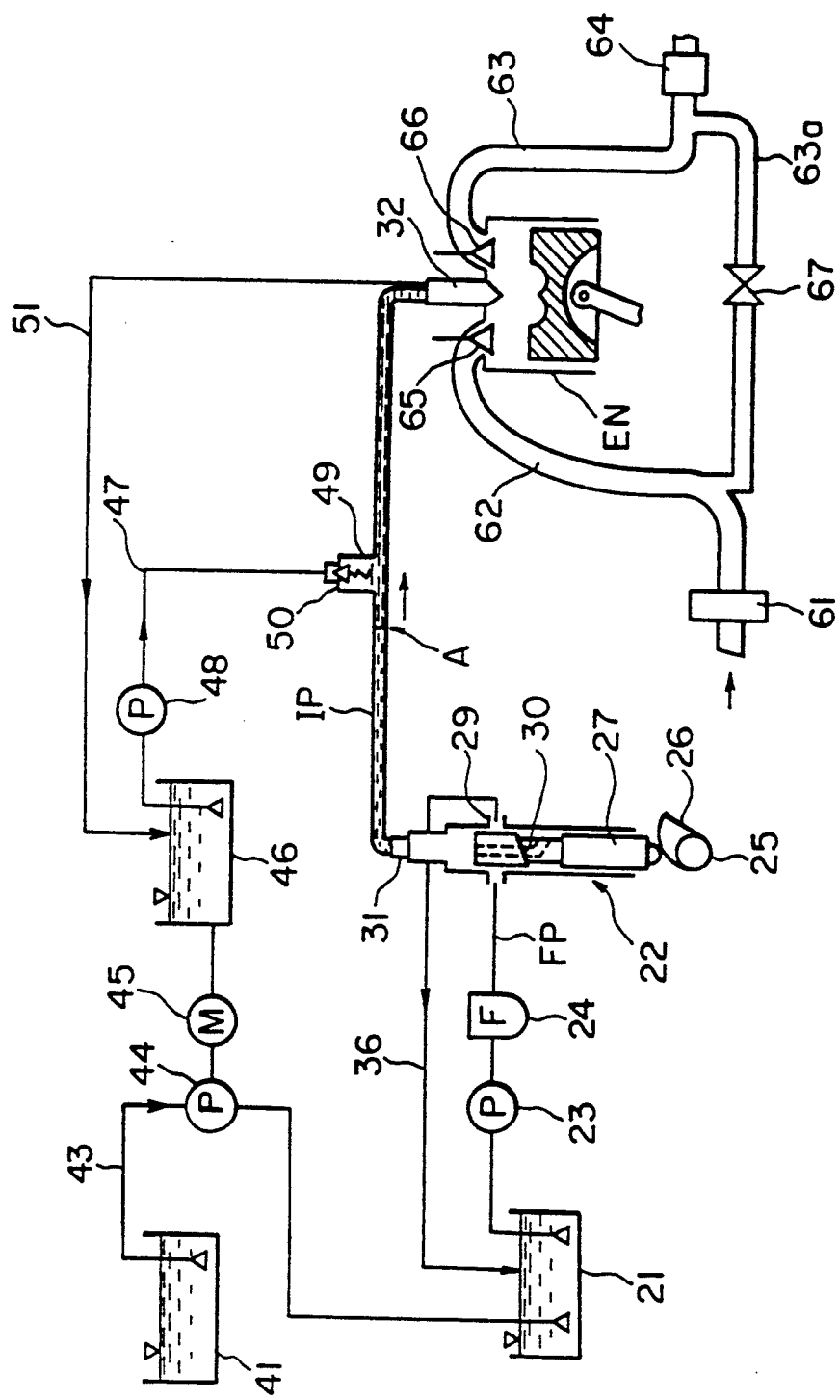
FIG. 1 is a block diagram of an emulsion fuel engine according to a first embodiment of the present invention.

Referring first to FIGS. 1 through 5, the emulsion fuel engine according to the first embodiment of this invention will be described. In FIG. 1, designated at numeral 21 is a first fuel tank in which diesel oil as a first fuel is stored. Arranged between the fuel tank 21 and an injection pump 22 is a fuel pipe FP which is provided with a fuel pump 23 for delivering the fuel and also with a fuel filter 24.

The injection pump 22 is provided with a reciprocating plunger 27 which moves up and down as a camshaft 25 rotates together with a cam 26. The injection pump 22 begins to draw the fuel after an upper end face of the plunger 27 has come to a position lower than a fuel draw/spill port 29. After the upper end face of the plunger 27 has moved to a position above the fuel draw/spill port 29, the injection pump 22 begins to deliver the fuel under pressure. When a lead 30 formed in a peripheral wall of the plunger 27 has overlapped the fuel draw/spill port 29, the injection pump 22 terminates the delivery of the fuel under pressure.

An injection pipe IP is arranged between a top portion of the injection pump 22 and an injection nozzle 32.

Figure 2:
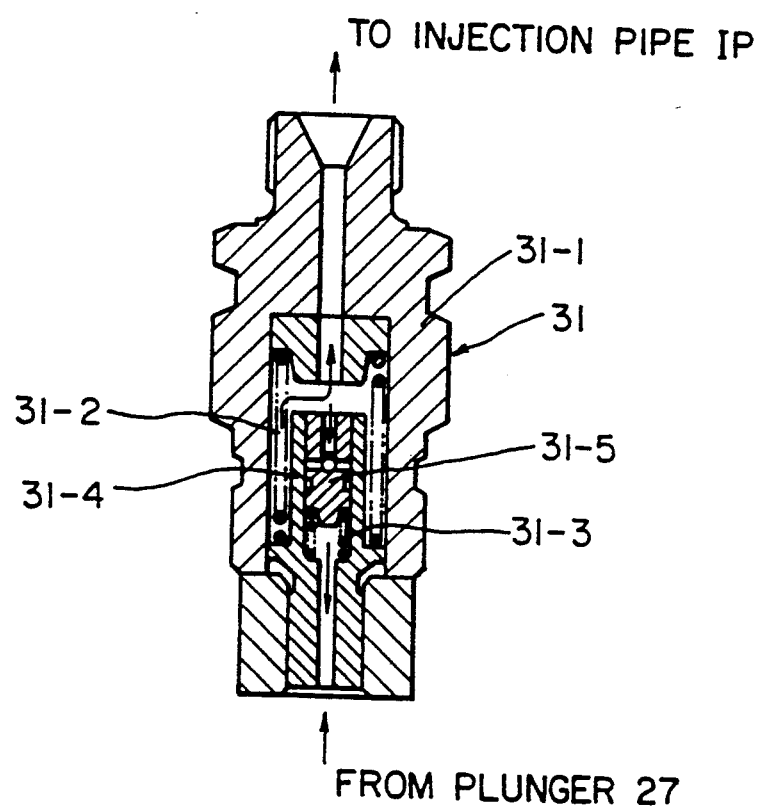
FIG. 2 is a cross-sectional view of a constant-pressure valve having a bidirectional check valve mechanism.

Designated at numeral 31 is a constant-pressure valve having a bidirectional check valve mechanism. This constant-pressure valve 31 serves to maintain the internal pressure of the injection pipe IP at a constant level and, as is illustrated in FIG. 2, is constructed of a housing 31-1, a first valve element 31-4 disposed in the housing 31-1 and biased by a first spring 31-2, and a second valve element 31-5 arranged in the first valve element 31-4 and biased by a second spring 31-3.

Owing to the construction as described above, the constant-pressure valve 31 operates as will be described next.

Upon initiation of an injection, the first valve element 31-4 is lifted against the spring force of the first spring 31-2 by the fuel fed under pressure from the plunger 27, whereby the fuel is fed to the injection pipe IP.

Upon completion of an injection, the first valve element 31-4 is brought to a valve-closing position by the first spring 31-2 and, at the same time, the second valve element 31-5 is depressed against the spring force of the second spring 31-3 by a residual fuel pressure in the injection pipe IP. The fuel inside the injection pipe IP is therefore returned. As soon as the residual fuel pressure in the injection pipe IP is lowered to the valve-closing pressure that the second valve element 31-4 is brought to a valve-closing position by the spring force of the second spring 31-3, the return of the fuel is stopped so that the internal pressure of the injection pipe IP is maintained at the valve-closing pressure.

An unillustrated fuel feed channel is formed inside the injection nozzle 32. Through the fuel feed channel free of illustration, the fuel which has been delivered under pressure from the injection pipe IP is guided to a lower part of the nozzle 32. A needle valve (not shown) is lifted by the pressure of the fuel, whereby the fuel is injected into a combustion chamber through unillustrated injector holes.

The fuel discharged from the injection pump 22 is returned to the fuel tank 21 via a fuel return pipe 36.

Numeral 41 indicates a second fuel tank in which water as a second fuel is stored. Pipings 42, 43 with distal ends thereof extending to bottom parts of the first and second fuel tanks 21, 41, respectively, are connected at proximal ends thereof to suction ports of a pump 44, respectively. Via a mixer 45 where diesel fuel and water are agitated and emulsified into an emulsion fuel, a delivery port of the pump 44 is connected to an emulsion fuel tank 46 in which the emulsion fuel is stored.

A fuel pipe 47 one end of which is located in a bottom part of the emulsion fuel tank 46 is provided with a fuel pump 48, and the other end of the fuel pipe 47 is connected to the injection pipe IP at a junction 49. At the junction 49, there is provided a check valve 50 so that the emulsion fuel is allowed to enter the injection pipe IP when the pressure of the emulsion fuel in the fuel pipe 47 becomes higher than the pressure of the fuel in the injection pipe IP.

Further, the fuel discharged from the injection pump 32 is returned to the emulsion fuel tank 46 via a fuel return pipe 51.

Designated at numeral 61 is an air cleaner. One end of the air cleaner 61 is connected to a combustion chamber of an engine EN via an intake pipe 62. The engine EN is also connected to one end of a muffler 64 via an exhaust pipe 63. Numerals 65 and 66 indicate an intake valve and an exhaust valve, respectively. A communicating passage 63a, which extends between the intake pipe 62 and the exhaust pipe 63, is provided with an EGR (exhaust gas recirculation) valve 67.

Figure 3:
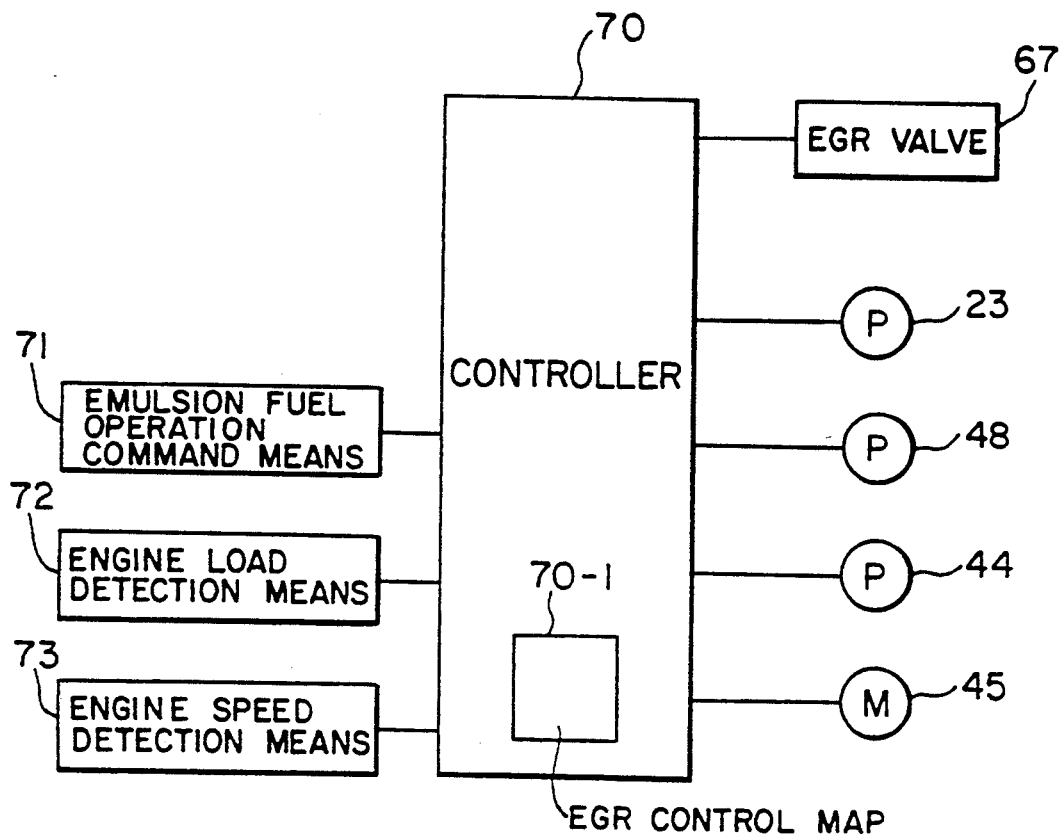
FIG. 3 is a block diagram of a control system for the emulsion fuel engine according to the first embodiment of this invention.

The EGR valve 67 is open/close controlled by a controller 70 shown in FIG. 3. This controller 70 is constructed of a microprocessor, ROM, RAM, a suitable I/O interface and the like. Functionally describing this controller 70, it is equipped with exhaust gas recirculation control means for controlling the amount of exhaust gas to be recirculated through the EGR valve 67 in accordance with the engine load. Described in more detail, the EGR valve 67 is controlled so that the opening of the EGR valve 67 is decreased when the engine load is high but is increased when the engine load is low. For this purpose, the controller 70 is provided with an EGR control map 70-1.

Figure 4:
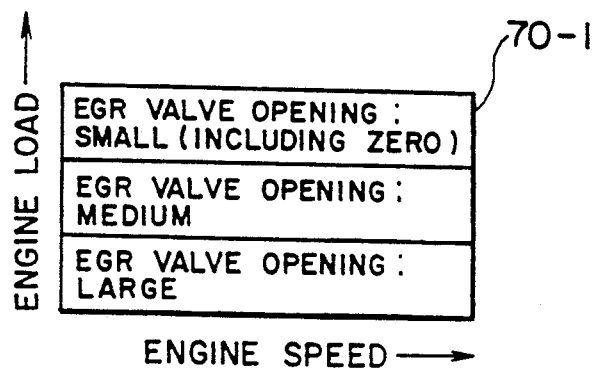
FIG. 4 is an illustration of an EGR control map.

In the EGR control map 70-1, there are set, as depicted in FIG. 4, data for decreasing the opening of the EGR valve 67 (to a level including zero) at high engine load, data for setting the opening of the EGR valve 67 at an intermediate level at intermediate engine load, and also data for increasing the opening of the EGR valve 67 at low engine load. As is also understood from FIG. 4, the engine load range is divided into plural (three) engine load sub-ranges and EGR valve opening information is set independently for each engine load sub-range.

The controller 70 can also function to control the fuel pumps 23, 48; the pump 44 and the mixer 45.

The controller 70 receives signals from emulsion fuel operation command means 71, engine load detection means 72, engine speed detection means 73, etc.

When an emulsion fuel operation is desired, the emulsion fuel operation command means 71 is operated to deliver a signal of that effect as a command to the controller 70.

The engine load detection means 72 detects the level of each engine load. Based on the results of the detection, the EGR control map 70-1 is retrieved to determine the opening of the EGR valve 67. The engine speed detector 73 detects the revolution speed of the engine in terms of rpm.

A description will next be made of an illustrative operation of the emulsion fuel engine of the first embodiment constructed as described above. When it is desired to operate the engine as a diesel engine with diesel fuel alone, the pump 44, the fuel pump 48 and the mixer 45 are stopped. In this case, the plunger 27 reciprocates up and down following rotation of the cam 26 rotating together with the cam shaft 25, whereby the injection pump 22 begins to draw the fuel after the upper end face of the plunger 27 has come to a position lower than the fuel draw/spill port 29, begins to deliver the fuel under pressure after the upper end face of the plunger 27 has moved to a position above the fuel draw/spill port 29, and then terminates the delivery of the fuel under pressure to the injection pump 22 when the lead 30 formed in a peripheral wall of the plunger 27 has overlapped the fuel draw/spill port 29. Since the fuel pump 47 is not operated, no emulsion fuel is allowed to enter the injection pipe IP.

The diesel fuel, which has been delivered under pressure from the injection pump 22 via the injection pipe IP, is hence injected into the combustion chamber through the injection nozzle 32, so that the engine is operated with the diesel fuel.

During the above operation, the EGR valve 67 is maintained in a closed position.

When it is desired to operate the engine as an emulsion engine with an emulsion fuel, on the other hand, a command of that effect is sent to the controller 70 via the emulsion fuel operation command means 71. Responsive to the command, the controller 70 operates the pump 44, the fuel pump 48 and the mixer 45 while maintaining the fuel pump 23 in operation and, at the same time, opens the EGR valve 67 to return some of the exhaust gas from the engine to the intake pipe 62.

After being drawn by the pump 44, the diesel fuel and the water are mixed in the mixer 45 and the resulting emulsion fuel is delivered to the emulsion fuel tank 46. The emulsion fuel stored in the emulsion fuel tank 46 is then delivered under pressure toward the junction 49 by the fuel pump 48.

Since the pressure of the emulsion fuel in the fuel pipe 47 becomes higher than the pressure of the fuel in the injection pipe IP during the period after the completion of delivery of diesel fuel under pressure by the injection pump 22 until the initiation of the next delivery of the same under pressure, the check valve 50 is opened during this period so that the emulsion fuel enters the injection pipe IP through the check valve 50.

As the emulsion fuel enters the injection pipe IP through the check valve 50 after the completion of the delivery of the diesel fuel under pressure by the injection pump 22 until the initiation of the next delivery of the same under pressure, several injections are then performed subsequent to the change-over to the emulsion fuel, resulting in the penetration of the emulsion fuel to a downstream portion of the injection pipe IP, said downstream portion being indicated by hatching in FIG. 1.

The emulsion fuel is then delivered forward under pressure by the diesel fuel fed under pressure from the injection pump 22, whereby the emulsion fuel is injected through the injection nozzle 32 to operate the engine as an emulsion engine with the emulsion fuel.

Some of the exhaust gas from the engine is recirculated to the combustion chamber of the engine via the exhaust pipe 63, the EGR valve 67 and the intake pipe 62 so that the exhaust gas recirculation (EGR) system is operated.

At this time, the EGR valve 67 is controlled so that the opening of the EGR valve 67 is decreased (to a level including zero) when the engine load is high but is increased when the engine load is low.

As the opening of the EGR valve 67 is increased to recirculate more exhaust gas when the engine load is low (i.e., in the intermediate or low load sub-range), the exhaust gas of high temperature is returned to the intake system so that the temperature of the intake air becomes higher. This leads to improvements in ignitability and ignition lag so that the combustion noise is decreased. The problem of inclusion of unburnt fuel in the exhaust gas is also reduced so that, needless to say, the emission of HC is also reduced.

Further, a decrease of the opening of the EGR valve 67 to a small level, even up to zero, at high engine load makes it possible to reduce the production of black smoke.

As has been described above, the emulsion fuel engine can avoid the deterioration of ignitability and, hence, the deterioration of the combustion noise which would otherwise occur when an emulsion fuel is employed as a fuel for an engine.

The boundary A between the diesel fuel and the emulsion fuel within the injection pipe IP moves in the direction indicated by arrow whenever each injection is completed. This boundary however returns approximately to the original position because the emulsion fuel enters the injection pipe IP through the check valve 50 after the completion of the delivery of the diesel fuel under pressure by the injection pump 22 until the initiation of the next delivery of the diesel fuel under pressure.

The boundary A of the emulsion fuel, however, does not flow backwards to the injection pump 22 because the delivery pressure of the injection pump 22 is high.

As has been described above, when the engine is operated using an emulsion fuel, the emulsion fuel does not flow through the injection pump unlike the conventional art. The emulsion fuel engine according to the present invention is therefore absolutely free of the problem that the durability of the injection pump 22 is reduced by excess wear due to insufficient lubrication and rusting.

Further, water and diesel fuel are mixed for the first time when the engine is operated by an emulsion fuel. The emulsion fuel engine according to this invention is also free of the problem that, when the emulsion fuel is left over for a long time, the emulsion fuel separates into diesel fuel and water, water is hence injected at a start, and a starting failure thus takes place due to poor ignitability.

The incorporation of the exhaust gas recirculation (EGR) system in the emulsion fuel engine has made it possible to cancel out the problem of increased combustion noise, a drawback of an emulsion fuel, by the exhaust gas recirculation (EGR) system as shown in FIG. 5.

In the first embodiment described above, the amount of the exhaust gas to be recirculated was changed depending on the engine load while the engine was operated with the emulsion fuel. The opening of the EGR valve can however be maintained at a constant value irrespective of the engine load.

Figure 6:
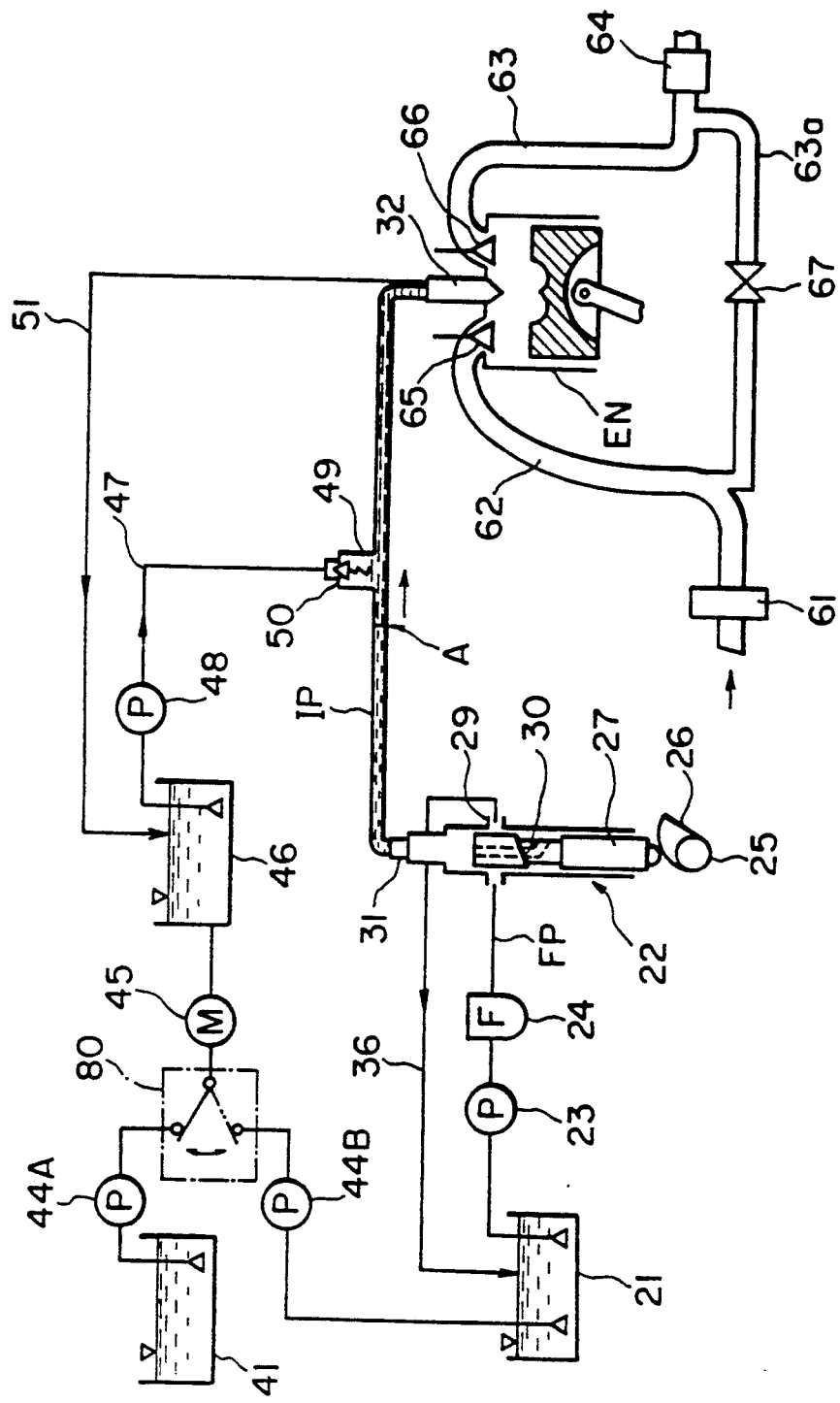
FIG. 6 is a block diagram of an emulsion fuel engine according to a second embodiment of the present invention.

The second embodiment of the present invention will be described next. In this second embodiment, not only the opening of the EGR valve 67 but also the mixing ratio of water to diesel fuel are changed depending on the engine load. To change the mixing ratio of water to diesel fuel as described above, a three-way solenoid valve 80 is connected to the first fuel tank 21 and the second fuel tank 41 as illustrated in FIG. 6, in which symbols 44A and 44B indicate pumps.

The EGR valve 67 and the three-way solenoid valve 80 are controlled by a controller 70' shown in FIG. 7. Like the controller 70 described above, the controller 70' is also constructed of a microprocessor, ROM, RAM, a suitable I/O interface and the like. Functionally describing this controller 70', it is equipped with exhaust gas recirculation control means for controlling the amount of exhaust gas to be recirculated through the EGR valve 67 in accordance with the engine load and also with mixing ratio adjusting means for adjusting the mixing ratio of water to diesel fuel at the three-way solenoid valve 80 in accordance with the engine load.

Described in more detail, the opening of the EGR valve 67 is decreased and the proportion of water is increased when the engine load is high; but the opening of the EGR valve 67 is increased and the proportion of water is decreased when the engine load is low. For these purposes, the controller 70' is provided with an EGR control map 70'-1 and an emulsion control map 70'-2.

In the EGR control map 70'-1, first, there are set, as depicted in FIG. 8(a), data for decreasing the opening of the EGR valve 67 (to a level including zero) at high engine load, data for setting the opening of the EGR valve 67 at an intermediate level at intermediate engine load, and also data for increasing the opening of the EGR valve 67 at low engine load.

In the emulsion control map 70'-2, on the other hand, there are set, as depicted in FIG. 8(b), data for increasing the proportion of water at high engine load, data for setting the proportion of water at an intermediate level at intermediate engine load, and also data for decreasing the proportion of water (to a level including zero) at low engine load.

As is also understood from FIGS. 8(a) and 8(b), the engine load range is divided into plural (three) engine load sub-ranges and EGR valve opening information and the proportion of water are set independently for each engine load sub-range. The engine load sub-ranges for EGR valve opening information and the engine load sub-ranges for water proportion information are consistent with each other.

The controller 70' are substantially the same as the above-described controller 70 in that the controller 70' also functions to control the fuel pumps 23, 48, the pumps 44A, 44B and the mixer 45.

Likewise the controller 70, the controller 70' receives signals from the emulsion fuel operation command means 71, the engine load detection means 72, the engine speed detection means 73, etc.

When the engine constructed as described above is operated as a diesel engine with diesel fuel alone, the operation is exactly the same as the operation of the first embodiment described above and its description is therefore omitted herein. When the engine is operated as an emulsion fuel engine with an emulsion fuel, a command of that effect is similarly sent to the controller 70' via the emulsion fuel operation command means 71, and the controller 70' then operates the three-way solenoid valve 80, the fuel pump 40, the pumps 44A, 44B and the mixer 45 while maintaining the fuel pump 23 in operation and, at the same time, opens the EGR valve 67 to return some of the exhaust gas from the engine to the intake pipe 62.

At this time, by signals from the controller 70', the EGR valve 67 and the three-way solenoid valve 80 control the amount of the exhaust gas to be recirculated and the mixing ratio of water to diesel fuel, respectively, in accordance with the engine load.

Namely, the EGR valve 67 and the three-way solenoid valve 80 are controlled at this time to decrease the opening of the EGR valve 67 (to a level including zero) and to increase the proportion of water when the engine load is high but to increase the opening of the EGR valve 67 and also to decrease the proportion of water (to a level including zero) when the engine load is low.

Described specifically, the control of the three-way solenoid valve 80 is effected to change the proportion of water by varying the time during which the valve 80 is maintained in its water-feeding position.

Since the opening of the EGR valve 67 is increased to recirculate more exhaust gas at low engine load (i.e., in the intermediate or low load sub-range) as described above, the exhaust gas of high temperature is returned to the intake system so that the temperature of the intake air becomes higher. This, coupled with the smaller proportion of water, leads to improvements in ignitability and ignition lag so that the combustion noise is decreased. The problem of inclusion of unburnt fuel in the exhaust gas is also reduced so that, needless to say, the emission of HC is also reduced.

Since the proportion of water is set at a high level when the engine load is high, a great deal of exhaust gas should be recirculated at this time from the standpoint of combustion noise. Black smoke is however produced if such a great deal of exhaust gas is recirculated. Therefore, the opening of the EGR valve 67 is conversely decreased, even to zero in some instances, in view of combustibility when the engine load is high, whereby the production of black smoke can be suppressed.

As has been described above, the second embodiment can also bring about similar effects or advantages to the above-described first embodiment.

Figure 9:
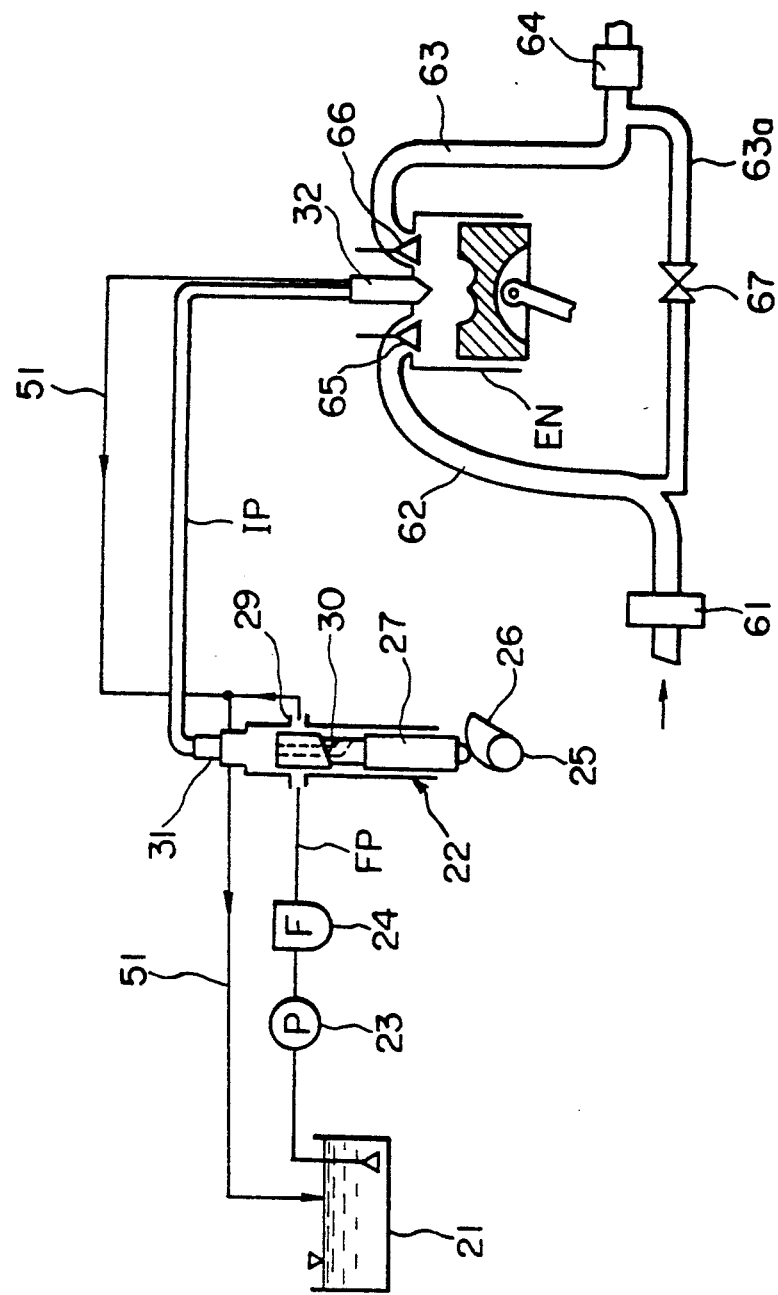
FIG. 9 is a block diagram of an emulsion fuel engine according to a third embodiment of the present invention.
Figure 10:
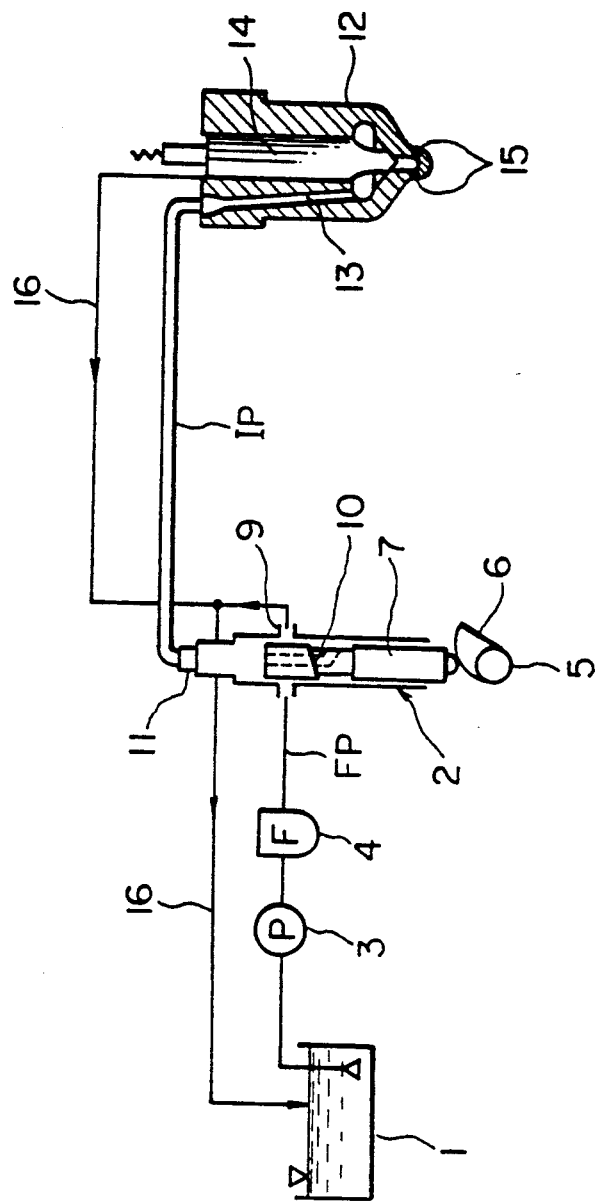
FIG. 10 is a block diagram of a conventional emulsion fuel engine.

The third embodiment of the present invention will next be described with reference to FIG. 9. In the emulsion fuel engine of the third embodiment, an emulsion fuel prepared in advance by mixing diesel fuel and water and stored in an emulsion fuel tank 1 is delivered to the injection nozzle 32 attached to the cylinder of the engine EN and is then injected into the cylinder. Some of exhaust gas is returned to the intake pipe 62 to permit recirculation of the exhaust gas. The EGR valve 67 is controlled in exactly the same manner or more as in the first embodiment described above.

Namely, the EGR valve 67 is controlled such that the opening of the EGR valve 67 is decreased at high engine load but is increased at low engine load.

As the opening of the EGR valve 67 is increased to recirculate more exhaust gas especially when the engine load is low (i.e., in the intermediate or low load sub-range) during operation with the emulsion fuel, the exhaust gas of high temperature is returned to the intake system so that the temperature of the intake air becomes higher. This leads to improvements in ignitability and ignition lag so that the combustion noise is decreased. The problem of inclusion of unburnt fuel in the exhaust gas is also reduced so that the emission of HC is also reduced.

Further, a decrease of the opening of the EGR valve 67 to a small level, even up to zero, at high engine load can bring about the advantageous effect that the production of black smoke can be reduced.

In the third embodiment, the constant-pressure valve 31 with the bidirectional check valve mechanism, said constant-pressure valve 31 being provided in the first and second embodiments described above, is also provided at the delivery port of the injection pump 22, said delivery port being located on the side of the injection pipe IP, instead of a check valve of the conventionally-provided type.

Similarly to the first embodiment described above, the opening of the EGR valve in the third embodiment can be maintained at a constant value irrespective of the engine load without changing, in accordance with the engine load, the amount of exhaust gas to be recirculated.

What is claimed is:

1. An emulsion fuel engine having at least one cylinder with an injection nozzle for injecting an emulsion fuel, which has been formed by mixing a first fuel with a second fuel, into the cylinder, comprising:
    exhaust gas recirculation means for returning a portion of exhaust gas to an intake passage to recirculate the exhaust gas; and
    exhaust gas recirculation control means for controlling the amount of the exhaust gas to be recirculated by the exhaust gas recirculation means.

2. The engine of claim 1, wherein said exhaust gas recirculation means comprises an EGR valve interposed in an exhaust gas recirculation passage extending between an exhaust passage and the intake passage for adjusting the amount of the exhaust gas to be recirculated through the exhaust gas recirculation passage; and the EGR valve is controlled by the exhaust gas recirculation control means so that the opening of the EGR valve is decreased when the engine load is high but the opening of the EGR valve is increased when the engine load is low.

3. The engine of claim 2, wherein an engine load range has been divided into plural engine load sub-ranges and EGR valve opening information has been set independently for each engine load sub-range.

4. The engine of claim 1, wherein said exhaust gas recirculation means comprises an EGR valve interposed in an exhaust gas recirculation passage extending between an exhaust passage and the intake passage for adjusting the amount of the exhaust gas to be recirculated through the exhaust gas recirculation passage; and said exhaust gas recirculation control means controls the opening of the EGR valve at a constant value irrespective of the engine load.

5. An emulsion fuel engine having at least one cylinder, comprising:
   a first fuel tank for storing a first fuel therein;
   a second fuel tank for storing a second fuel therein;
   an injection nozzle attached to the cylinder;
   an injection pump for drawing the first fuel from the first fuel tank and delivering under pressure the first fuel at a predetermined timing toward the injection nozzle;
   means for mixing the first fuel from the first fuel tank and the second fuel from the second fuel tank, whereby an emulsion fuel is formed;
   means for feeding the emulsion fuel, which has been delivered from said mixing means to an injection pipe at a location between the injection pump and the injection nozzle;
   exhaust gas recirculation means for returning a portion of exhaust gas to an intake passage to recirculate the exhaust gas; and
   exhaust gas recirculation control means for controlling the amount of the exhaust gas to be recirculated by said exhaust gas recirculation means.

6. The engine of claim 5, wherein said exhaust gas recirculation means comprises an EGR valve interposed in an exhaust gas recirculation passage extending between an exhaust passage and the intake passage for adjusting the amount of the exhaust gas to be recirculated through the exhaust gas recirculation passage; and the EGR valve is controlled by the exhaust gas recirculation control means so that the opening of the EGR valve is decreased when the engine load is high but the opening of the EGR valve is increased when the engine load is low.

7. The engine of claim 6, wherein an engine load range has been divided into plural engine load sub-ranges and EGR valve opening information has been set independently for each engine load sub-range.

8. The engine of claim 5, wherein said exhaust gas recirculation means comprises an EGR valve interposed in an exhaust gas recirculation passage extending between an exhaust passage and the intake passage for adjusting the amount of the exhaust gas to be recirculated through the exhaust gas recirculation passage; and said exhaust gas recirculation control means controls the opening of the EGR valve at a constant value irrespective of the engine load.

9. An emulsion fuel engine having at least one cylinder, comprising:
   a first fuel tank for storing a first fuel therein;
   a second fuel tank for storing a second fuel therein;
   an injection nozzle attached to the cylinder;
   an injection pump for drawing the first fuel from the first fuel tank and delivering under pressure the first fuel at a predetermined timing toward the injection nozzle;
   means for mixing the first fuel from the first fuel tank and the second fuel from the second fuel tank, whereby an emulsion fuel is formed;
   means for feeding the emulsion fuel, which has been delivered from said mixing means to an injection pipe at a location between the injection pump and the injection nozzle;
   exhaust gas recirculation means for returning a portion of exhaust gas to an intake passage to recirculate the exhaust gas; and
   exhaust gas recirculation control means for controlling the amount of the exhaust gas to be recirculated by said exhaust gas recirculation means;
   wherein said mixing means changes the mixing ratio of the first fuel to the second fuel in accordance with the engine load.

10. An emulsion fuel engine having at least one cylinder, comprising:
    a first fuel tank for storing a first fuel therein;
    a second fuel tank for storing a second fuel therein;
    an injection nozzle attached to the cylinder;
    an injection pump for drawing the first fuel from the first fuel tank and delivering under pressure the first fuel at a predetermined timing toward the injection nozzle;
    means for mixing the first fuel from the first fuel tank and the second fuel from the second fuel tank, whereby an emulsion fuel is formed;
    means for feeding the emulsion fuel, which has been delivered from said mixing means to an injection pipe at a location between the injection pump and the injection nozzle;
    exhaust gas recirculation means for returning a portion of exhaust gas to an intake passage to recirculate the exhaust gas; and
    exhaust gas recirculation control means for controlling the amount of the exhaust gas to be recirculated by said exhaust gas recirculation means;
    wherein said mixing means comprises a three-way valve connected to both the first fuel tank and the second fuel tank so that the mixing ratio of the first fuel to the second fuel can be changed.

11. An emulsion fuel engine having at least one cylinder, comprising:
    a first fuel tank for storing a first fuel therein;
    a second fuel tank for storing a second fuel therein;
    an injection nozzle attached to the cylinder;
    an injection pump for drawing the first fuel from the first fuel tank and delivering under pressure the first fuel at a predetermined timing toward the injection nozzle;
    means for mixing the first fuel from the first fuel tank and the second fuel from the second fuel tank, whereby an emulsion fuel is formed;
    means for feeding the emulsion fuel, which has been delivered from said mixing means to an injection pipe at a location between the injection pump and the injection nozzle;
    exhaust gas recirculation means for returning a portion of exhaust gas to an intake passage to recirculate the exhaust gas; and
    exhaust gas recirculation control means for controlling the amount of the exhaust gas to be recirculated by said exhaust gas recirculation means;
    wherein said exhaust gas recirculation means comprises an EGR valve interposed in an exhaust gas recirculation passage extending between an exhaust passage and the intake passage for adjusting the amount of the exhaust gas to be recirculated through the exhaust gas recirculation passage;

whereby, when the engine load is high, the opening of the EGR valve is decreased and the proportion of the second fuel is increased; and when the engine load is low, the opening of the EGR valve is increased and the proportion of the second fuel is decreased.

12. The engine of claim 11, wherein an engine load range has been divided into first plural engine load sub-ranges for EGR valve opening information and also into second plural engine load sub-ranges for first fuel/second fuel mixing ratio information; and EGR valve opening information and mixing ratio information have been set independently for each engine load sub-range.

13. The engine of claim 12, wherein the first plural engine load sub-ranges for the EGR valve opening information and the second plural engine load sub-ranges for the first fuel/second fuel mixing ratio information are consistent with each other.

14. An emulsion fuel engine having at least one cylinder, comprising:

a first fuel tank for storing a first fuel therein;

a second fuel tank for storing a second fuel therein;

an injection nozzle attached to the cylinder;

an injection pump for drawing the first fuel from the first fuel tank and delivering under pressure the first fuel at a predetermined timing toward the injection nozzle;

means for mixing the first fuel from the first fuel tank and the second fuel from the second fuel tank, whereby an emulsion fuel is formed;

means for feeding the emulsion fuel, which has been delivered from said mixing means to an injection pipe at a location between the injection pump and the injection nozzle;

exhaust gas recirculation means for returning a portion of exhaust gas to an intake passage to recirculate the exhaust gas;

exhaust gas recirculation control means for controlling the amount of the exhaust gas to be recirculated by said exhaust gas recirculation means; and a constant pressure valve having the mechanism of a bidirectional check valve disposed at a discharge port of the injection pump, said discharge port being on a side of the injection pipe.

15. An emulsion fuel engine having at least one cylinder, comprising:

a first fuel tank for storing a first fuel therein;

a second fuel tank for storing a second fuel therein;

an injection nozzle attached to the cylinder;

an injection pump for drawing the first fuel from the first fuel tank and delivering under pressure the first fuel at a predetermined timing toward the injection nozzle;

means for mixing the first fuel from the first fuel tank and the second fuel from the second fuel tank, whereby an emulsion fuel is formed;

means for feeding the emulsion fuel, which has been delivered from said mixing means to an injection pipe at a location between the injection pump and the injection nozzle;

exhaust gas recirculation means for returning a portion of exhaust gas to an intake passage to recirculate the exhaust gas; and exhaust gas recirculation control means for controlling the amount of the exhaust gas to be recirculated by said exhaust gas recirculation means; and an emulsion fuel tank for storing the emulsion fuel from said mixing means disposed between said mixing means and said emulsion fuel feeding means.

16. An emulsion fuel engine having at least one cylinder, comprising:

a first fuel tank for storing a first fuel therein;

a second fuel tank for storing a second fuel therein;

an injection nozzle attached to the cylinder;

an injection pump for drawing the first fuel from the first fuel tank and delivering under pressure the first fuel at a predetermined timing toward the injection nozzle;

means for mixing the first fuel from the first fuel tank and the second fuel from the second fuel tank, whereby an emulsion fuel is formed;

means for feeding the emulsion fuel, which has been delivered from said mixing means to an injection pipe at a location between the injection pump and the injection nozzle;

exhaust gas recirculation means for returning a portion of exhaust gas to an intake passage to recirculate the exhaust gas; and exhaust gas recirculation control means for controlling the amount of the exhaust gas to be recirculated by said exhaust gas recirculation means;

wherein sad emulsion fuel feeding means is provided with a check valve so that the emulsion fuel is allowed to penetrate into the injection pipe when the pressure of the emulsion fuel has become higher than the pressure of the fuel within the injection pipe.

* * * * *